US009225048B2

(12) United States Patent
Place

(10) Patent No.: US 9,225,048 B2
(45) Date of Patent: Dec. 29, 2015

(54) ANTENNA PROTECTION DEVICE AND SYSTEM

(75) Inventor: Richard Alan Place, Canandaigua, NY (US)

(73) Assignee: General Electric Company, Schenectady, NY (US)

( * ) Notice: Subject to any disclaimer, the term of this patent is extended or adjusted under 35 U.S.C. 154(b) by 1091 days.

(21) Appl. No.: 13/033,209

(22) Filed: Feb. 23, 2011

(65) Prior Publication Data

US 2012/0212079 A1 Aug. 23, 2012

(51) Int. Cl.

| | |
|---|---|
| ***H02H 99/00*** | (2009.01) |
| ***H01P 1/08*** | (2006.01) |
| ***H01P 1/04*** | (2006.01) |
| ***H01P 5/02*** | (2006.01) |

(52) U.S. Cl.

CPC *H01P 1/08* (2013.01); *H01P 1/042* (2013.01); *H01P 5/024* (2013.01)

(58) Field of Classification Search

CPC ............ H01P 5/024; H01P 1/08; H01P 1/042
USPC ............................................ 343/907; 333/252
See application file for complete search history.

(56) References Cited

U.S. PATENT DOCUMENTS

| | | | | |
|---|---|---|---|---|
| 4,630,316 | A * | 12/1986 | Vaughan | 455/129 |
| 4,631,494 | A * | 12/1986 | Gould | 330/286 |
| 4,786,883 | A | 11/1988 | Spinner | |
| 5,136,272 | A * | 8/1992 | Kormann et al. | 333/252 |
| 5,557,290 | A | 9/1996 | Watanabe | |
| 5,629,657 | A * | 5/1997 | Bayorgeon et al. | 333/254 |
| 7,180,392 | B2 | 2/2007 | Grothen et al. | |
| 2009/0219116 | A1 | 9/2009 | Seong | |

FOREIGN PATENT DOCUMENTS

| | | | |
|---|---|---|---|
| JP | 59028701 | A | 2/1984 |
| NZ | 208213 | A | 10/1987 |

OTHER PUBLICATIONS

European Search Report issued in connection with corresponding EP Patent Application No. 12156503.0 filed on Feb. 22, 2012.
NZ Examination Report issued in connection with corresponding NZ Application No. 598327 on Feb. 28, 2012.

* cited by examiner

*Primary Examiner* — Hoang V Nguyen
*Assistant Examiner* — Michael Bouizza
(74) *Attorney, Agent, or Firm* — Armstrong Teasdale LLP

(57) ABSTRACT

A protection device for electrically insulating an antenna from a signal receiving device while transferring RF signals, and a system including the same are disclosed. In an embodiment, the protection device includes a first waveguide in signal communication and electrical communication with the antenna; and a second waveguide in signal communication and electrical communication with the signal receiving device. The first waveguide and the second waveguide are arranged in an end to end coaxial relationship facing one another, and the first waveguide and the second waveguide are electrically insulated from one another, such that a high voltage from accidental contact of the antenna with a power line cannot pass from the antenna to the signal receiving device. RF signals pass from the antenna to the signal receiving device through the protection device with minimal signal loss.

20 Claims, 4 Drawing Sheets

ANTENNA PROTECTION DEVICE AND SYSTEM

BACKGROUND OF THE INVENTION

The disclosure relates generally to providing protection during the performance of site surveys for deploying wireless systems. More particularly, the invention relates to isolating personnel from antennas that are used in site surveys, which may come in contact with high-voltage power lines.

The performance of site surveys is part of deploying wireless systems. Typically, an antenna is raised on a fiberglass mast or pole in order to determine whether radio coverage is possible at a particular location. Frequently, the site survey may seek to evaluate a particular telephone pole as a potential candidate for permanent placement of an antenna. If in the course of conducting the site survey at such a location, the antenna is accidentally allowed to touch a power line, the fiberglass mast protects the individual holding it, but personnel operating test equipment in electrical connection with the antenna, including an attached receiver, transceiver, piece of testing equipment used to measure signal strength, or computer, may be injured or killed by the current, which may be at a high voltage.

BRIEF DESCRIPTION OF THE INVENTION

Embodiments of the invention provide a protection device and a system including a protection device inserted in the feed path, electrically insulating the antenna from the receiving device, while allowing the RF signal to pass between the antenna and signal receiving device.

A first aspect of the disclosure provides a protection device comprising a first waveguide in signal communication with and electrical communication with an antenna; and a second waveguide in signal communication with the first waveguide and a signal receiving device. The first waveguide and the second waveguide are arranged in an end to end relationship, and the first waveguide and the second waveguide are electrically insulated from one another.

A second aspect of the disclosure provides a system comprising: an antenna; a protection device in signal communication and electrical communication with the antenna; and a signal receiving device in signal communication with the antenna and the protection device, wherein the signal receiving device is not in electrical communication with the antenna. The protection device includes a first waveguide in signal communication with and electrical communication with an antenna; and a second waveguide in signal communication with the first waveguide and a signal receiving device. The first waveguide and the second waveguide are arranged in an end to end relationship, and the first waveguide and the second waveguide are electrically insulated from one another.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

At least one embodiment of the present invention is described below in reference to its application in connection with the performance of a site survey for implementing a wireless network. Although embodiments of the invention are illustrated relative to an antenna and a receiving device, which may be a receiver, a transceiver, or piece of test equipment, it is understood that the teachings are equally applicable to other electromagnetic (EM) signal transmitters and sources and receiving devices. Further, at least one embodiment of the present invention is described below in reference to a nominal size and including a set of nominal dimensions. However, it should be apparent to those skilled in the art that the present invention is likewise applicable to any suitable EM signal source or transmitter and receiving device. Further, it should be apparent to those skilled in the art that the present invention is likewise applicable to various scales of the nominal size and/or nominal dimensions.

As indicated above, and as illustrated in FIGS. 1-5, aspects of the invention provide a protection device 10 structure and a system 5 including the same.

Figure 1:
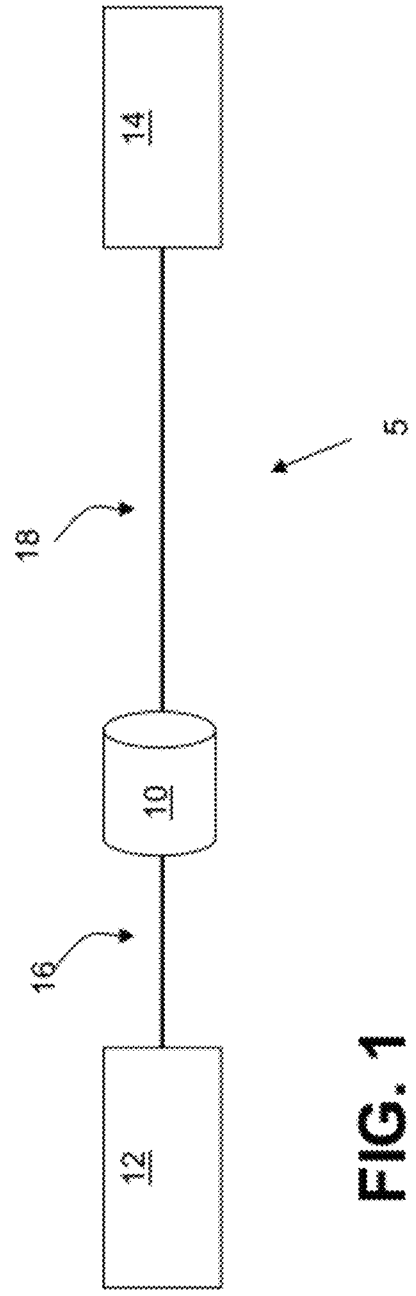
FIG. 1 shows a cable connection between two devices in accordance with an embodiment of the disclosure.

Turning now to the drawings, FIG. 1 illustrates a protection device 10 in accordance with embodiments of the invention, between an antenna 12 and a signal receiving device 14. Antenna 12 may either be the source of the signal passing through protection device 10, or may transmit an RF signal originating from a transceiver or transmitter. Protection device 10 is inserted in series along the cable connection 16, 18 in order to interrupt DC or AC voltage while allowing propagation of high frequency signals from antenna 12 to the signal receiving device 14, i.e., protection device 10 blocks high voltage direct current or alternating current from antenna 12, breaking the direct electrical connection, or electrical communication, between antenna 12 and the receiving device 14, while passing RF signals at, e.g., frequencies between about 30 MHz and about 300 GHz depending on the particular embodiment of protection device 10.

Figure 2:
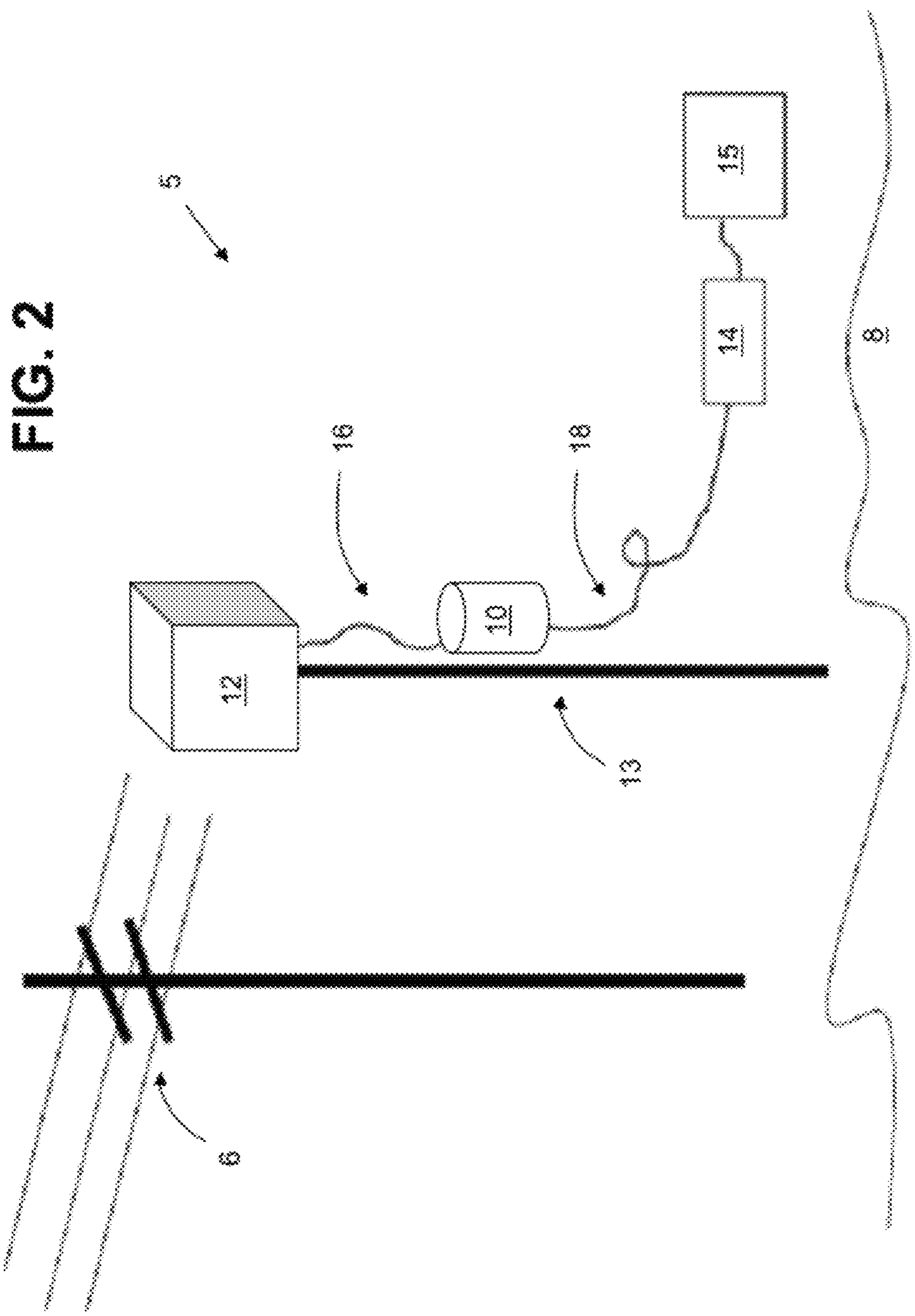
FIG. 2 shows a system in accordance with an embodiment of the disclosure.

FIG. 2 shows a system 5 including protection device 10 in accordance with one embodiment of the invention. System 5 includes an antenna 12 in signal communication and electrical communication with the protection device 10 via first cable 16. Thus, RF signals as well as high voltage AC or DC currents pass from antenna 12 to protection device 10. System 5 further includes a signal receiving device 14, which may be a radio device such as a receiver or a transceiver such as a WiFi or WiMax wireless modem among other types of receiving devices, or it could be testing equipment such as a spectrum analyzer used to measure RF signal strength. Protection device 10 is inserted into the path between signal receiving device 14 and antenna 12, typically using first and second cables 16 and 18 as shown in FIG. 2. In some embodiments, cables 16, 18 may be coaxial cables. RF signals propagate through protection device 10, however high voltage AC or DC currents are blocked owing to the separation between the two halves of the protection device. Protection device 10, which will be described in greater detail below, electrically insulates receiving device 14 from antenna 12. Receiving device 14 may further be in signal communication with a computing device 15 such as, e.g., a laptop computer, used to analyze signals received.

In one embodiment, antenna 12 may be affixed to mast 13, used to position antenna 12 to conduct a site survey. Mast 13 may be made of fiberglass or other electrically insulating material. First cable 16 may have a length, for example, 1-2 meters, such that when antenna 12 is raised on mast 13, protection device 10 is out of reach of personnel on the ground, preventing them from harm due to high voltage present on cable 16 and first waveguide 20 should the antenna touch power lines 6.

Figure 3:
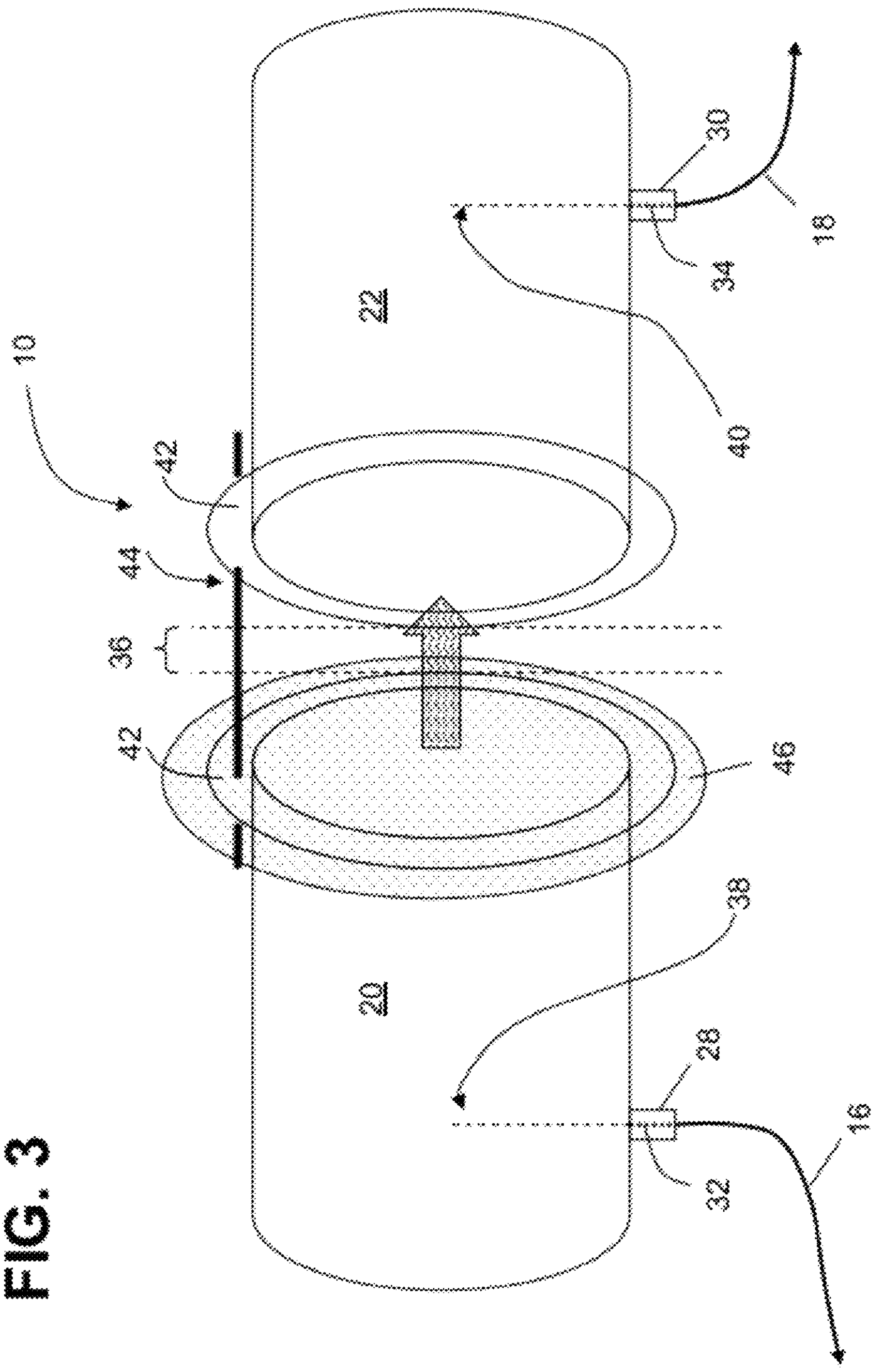
FIG. 3 shows a protection device in accordance with an embodiment of the disclosure.

Protection device 10 is illustrated in greater detail in FIG. 3. As shown in FIG. 3, protection device 10 includes first waveguide 20 in signal communication and electrical communication with antenna 12 (FIG. 2) via first cable 16. Protection device 10 further includes second waveguide 22, which is in signal communication with first waveguide 20 and signal receiving device 14 (FIG. 2) via second cable 18. First waveguide 20 and second waveguide 22 are arranged in an end to end coaxial relationship facing one another, but are electrically insulated from one another. In the embodiment depicted in FIG. 3, each of first and second waveguides 20, 22 are circular waveguides. In other embodiments, however, as in FIGS. 4-5, each of first and second waveguides 20, 22 may be rectangular waveguides. In still further embodiments, other antenna structures may be used, such as radio frequency (RF) transformers or pairs of coupled coils.

Regardless of the shape of first and second waveguides 20, 22, each waveguide further includes a connector 28, 30 for providing signal connectivity between protection device 10 and first and second cables 16, 18, respectively. A first connector 28 is disposed between first waveguide 20 and antenna 12. As shown in FIG. 3, first connector 28 includes a first pin 32 inserted through a wall of first waveguide 20. A first wire 38 is connected to an end of the first pin 32 on an interior of waveguide 20 by, e.g., soldering or other means known in the art. First wire 38 extends from the end of first pin 32 into an interior of first waveguide 20. First cable 16 connects the opposite end of first pin 32, on an exterior of waveguide 20, with antenna 12. Second connector 30 is disposed between second waveguide 22 and signal receiving device 14 in a fashion similar to first connector 28. Second connector 30 includes second pin 34 inserted through a wall of second waveguide 22. A second wire 40 is connected to an end of the second pin 34 on an interior of waveguide 22 by, e.g., soldering or other means known in the art. Second wire 40 extends from the end of second pin 34 into an interior of second waveguide 22. Second cable 18 connects the opposite end of second pin 34, on an exterior of waveguide 22, with signal receiving device 14. As in the embodiments shown in FIGS. 3-4, connectors 28, 30 may each be disposed on an axially extending face of waveguides 20, 22 respectively. However, in other embodiments, such as the one shown in FIG. 5 connectors 28, 30 may be located on end faces of waveguides 20, 22.

Referring again to FIG. 3, first waveguide 20 is physically isolated from second waveguide 22 by a distance 36 which may vary with the size of protection device 10 and the frequency of the RF signal being propagated therethrough. In one embodiment which may be used at frequencies including but not limited to the range of about 3.5 GHz to about 4.0 GHz, distance 36 may be equal to approximately 1 mm. In other embodiments of protection device 10, in which the size of waveguides 20, 22 and other parameters may vary, distance 36 may be either more or less than 1 mm. Distance 36 represents a balance between quality of the RF signal passed through protection device 10 and the amount of protection provided from high voltage. As distance 36 increases, it may introduce some loss in the desired RF signal being coupled through protection device 10. As distance 36 decreases, distance 36 may not provide adequate insulation from high voltages. Accordingly, distance 36 may vary with application. Some embodiments may further include insulating material 46 between waveguides 20, 22 to provide insulation from high voltages. The particular insulating material 46 may be chosen to withstand a particular voltage or range of voltages. For example, in an embodiment having a 1 mm thick insulating material 46 having an exemplary dielectric strength of 15 kV/mm, insulating material 46 would insulate against a 15,000 volt current. In one embodiment, the insulating material 46 may be a polyimide tape having a dielectric strength of about, e.g., 291 kV/mm. In other embodiments, materials such as, e.g., plastics having a dielectric strength of about 15 kV/mm to about 20 kV/mm, or polytetrafluoroethylene, having a dielectric strength of about 60 kV/mm, may be used as insulating material 46, among other suitable materials. The use of insulating material 46 allows for a greater degree of electrical isolation between waveguides 20, 22, and therefore greater protection, particularly where distance 36 is small.

Waveguides 20, 22 may be cast from, e.g., aluminum, brass, stainless steel, and other materials, and may each include a flange 42 to facilitate affixing one to the other. Waveguides 20, 22 may be affixed to one another using any conventional means such as nylon/insulated screws or bolts 44. In other embodiments, rather than separate waveguides 20, 22, protection device 10 may be made from a single plastic cavity with a metallized coating at each end, and a void between the metallized ends providing the necessary electrical insulation. In such an embodiment, air, having a pressure-dependent dielectric strength of about 3 kV/mm, or other gas, takes the place of both distance 36 and insulating material 46.

Figures 4, 5:
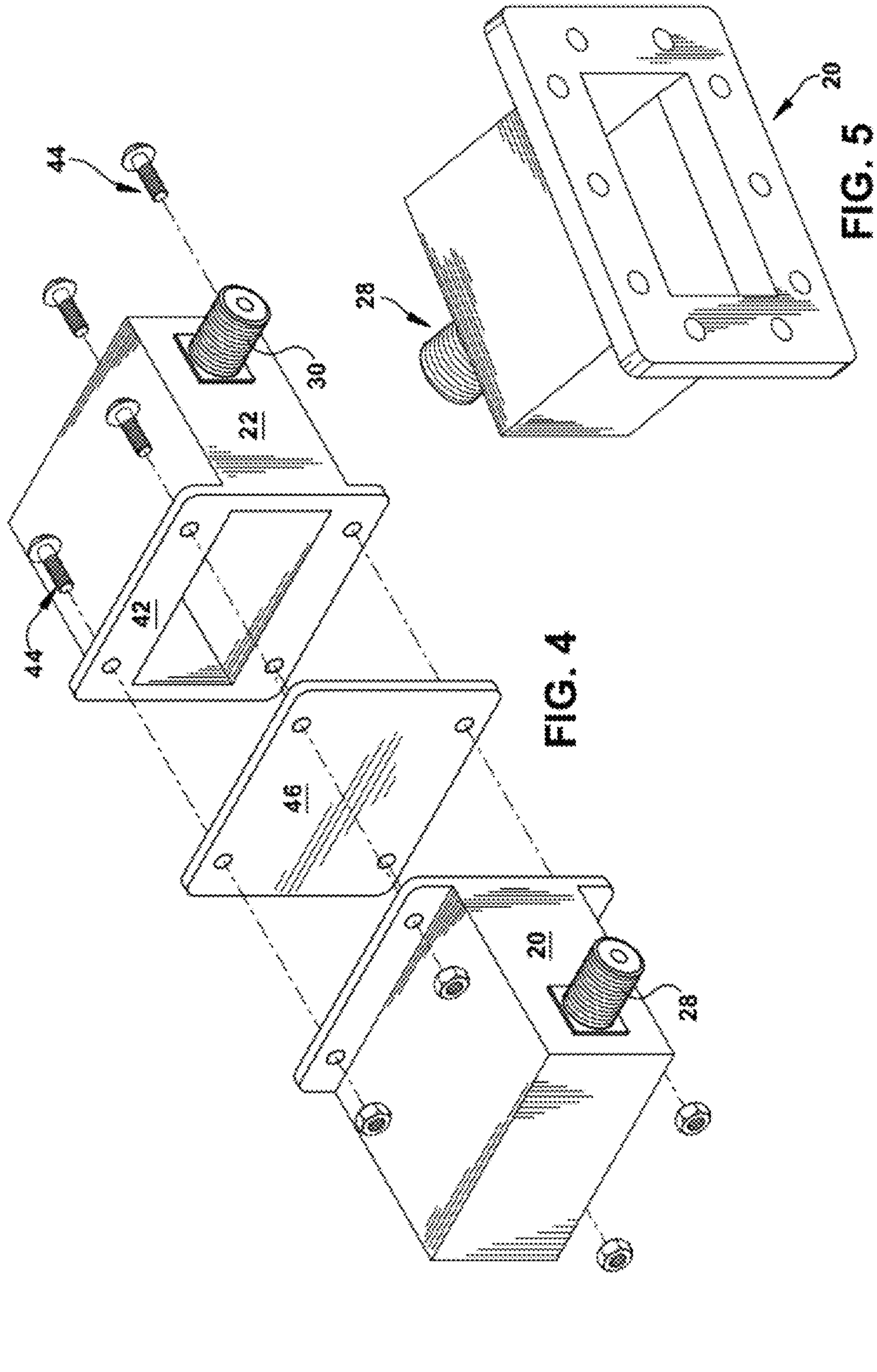
FIG. 4 shows an exploded view of a protection device in accordance with an embodiment of the disclosure.
FIG. 5 shows a waveguide in accordance with an embodiment of the disclosure.

Protection device 10 may be used over a variety of frequencies of RF signal. In some embodiments, the frequency of the RF signal transferred may be from about 1 GHz to about 300 GHz. The size of waveguides 20, 22 may vary by application, relative to the desired frequency of the RF signal from antenna 12. More specifically, the size of waveguides 20, 22 is inversely proportional to the frequency of the RF signal being transferred. Therefore, lower frequencies will require larger waveguides 20, 22. In one embodiment, waveguides 20, 22 are circular waveguides, and a diameter of each of the first and the second waveguides is about 5.08 cm; a length of each of the first and the second waveguides is about 10.16 cm; and a frequency of an RF signal from antenna 12 is about 3.5 GHz to about 4.0 GHz. This is only one possible embodiment, however. Referring to FIG. 4, in another embodiment, by way of example only, waveguides 20, 22 are rectangular waveguides, and a length and width of each of the first and the second waveguides is about 5.8 cm and 2.9 cm respectively, exclusive of flange 42; and a frequency of a signal from antenna 12 is between about 3.3 GHz and about 4.9 GHz. As noted, for use with a lower frequency RF signal, waveguides 20, 22 having a larger diameter and length may be used. The following waveguide sizes and frequencies are merely exemplary, and are not intended to be limiting in nature:

| Frequency Band of operation (GHz) (approximate) | Inner dimensions of waveguide opening (cm) (approximate) |
|---|---|
| 1.15-1.72 | 16.51 × 8.255 |
| 1.45-2.20 | 12.954 × 6.477 |
| 1.72-2.60 | 10.922 × 5.461 |

-continued

| Frequency Band of operation (GHz) (approximate) | Inner dimensions of waveguide opening (cm) (approximate) |
|---|---|
| 2.20-3.30 | 8.636 × 4.318 |
| 2.60-3.95 | 7.2136 × 3.4036 |
| 3.30-4.90 | 5.8166 × 2.9083 |
| 3.95-5.85 | 4.7549 × 2.2149 |
| 4.90-7.05 | 4.0386 × 2.0193 |
| 5.85-8.20 | 3.4849 × 1.5799 |
| 7.05-10.00 | 2.8499 × 1.2624 |
| 8.20-12.40 | 2.286 × 1.0160 |
| 10.00-15.00 | 1.9050 × 0.9525 |
| 12.40-18.00 | 1.5799 × 0.7899 |
| 15.00-22.00 | 1.2954 × 0.6477 |
| 18.00-26.50 | 1.0668 × 0.4318 |
| 22.00-33.00 | 0.8636 × 0.4318 |
| 26.50-40.00 | 0.7112 × 0.3556 |
| 33.00-50.00 | 0.5690 × 0.2845 |
| 40.00-60.00 | 0.4775 × 0.2388 |
| 50.00-75.00 | 0.3759 × 0.1880 |
| 60.00-90.00 | 0.3099 × 0.1549 |
| 75.00-110.00 | 0.2540 × 0.1270 |
| 90.00-140.00 | 0.2032 × 0.1016 |
| 112.00-172.00 | 0.1651 × 0.0826 |
| 140.00-220.00 | 0.1295 × 0.0648 |
| 172.00-260.00 | 0.1092 × 0.0546 |
| 220.00-330.00 | 0.0864 × 0.0432 |

In addition to interrupting high voltage from flowing from antenna 12 to signal receiving device 14, protection device 10 may also be used to filter signals propagated through the network. Because of the relationship between size of waveguides 20, 22 and the wavelength of the signal which they are designed to transfer, signals falling outside a given range of frequencies for a particular protection device 10 size will be attenuated. This has the advantage of reducing out of band noise and interference.

Protection device 10 is designed such that insertion into system 5 between antenna 12 and receiving device 14 results in almost no loss in RF signal strength, i.e. typically less than 1 dB of loss is possible. Protection device also has a low voltage standing wave ratio (VSWR), i.e., typically 1.3:1. A VSWR of 1:0:1 represents an ideal device, i.e. a device having no effect on impedance match between antenna 12 and receiving device 14. Devices having a VSWR of 1:5:1 are more typical.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A protection device comprising:

a first waveguide in signal communication and electrical communication with an antenna; and a second waveguide in signal communication with the first waveguide and a signal receiving device;

wherein the first waveguide and the second waveguide are arranged in an end to end coaxial relationship, wherein the first waveguide and the second waveguide are electrically insulated from one another; and wherein the first waveguide and the second waveguide each include a flange, wherein the flange of the first waveguide is coupled to the flange of the second waveguide using electrically insulated hardware.

2. The protection device of claim 1, further comprising:

a first connector disposed between the first waveguide and the antenna, wherein the first connector includes a first pin inserted through a wall of the first waveguide, and a first wire connected to an interior end of the first pin and extending into an interior of the first waveguide, wherein a first cable connects an exterior end of the first pin to the antenna; and a second connector disposed between the second waveguide and the signal receiving device, wherein the second connector includes a second pin inserted through a wall of the second waveguide, and a second wire connected to an interior end of the second pin and extending into an interior of the second waveguide, wherein a second cable connects an exterior end of the second pin to the signal receiving device.

3. The protection device of claim 1, wherein the first waveguide is electrically and physically isolated from the second waveguide by an unobstructed gap between an opening of the first waveguide and an opening of the second waveguide, wherein the first waveguide is situated a distance from the second waveguide.

4. The protection device of claim 1, wherein the first waveguide is electrically insulated from the second waveguide by an insulating material disposed between the first waveguide and the second waveguide, wherein the insulating material completely covers an opening of at least one of the first waveguide and the second waveguide.

5. The protection device of claim 4, wherein the insulating material has a dielectric strength of at least about 15 kV/mm.

6. The protection device of claim 1, wherein the protection device has a voltage standing wave ratio (VSWR) of less than about 1:5:1.

7. The protection device of claim 1, wherein a size of each of the first waveguide and the second waveguide is inversely proportional to a desired signal frequency.

8. The protection device of claim 1, wherein each of the first waveguide and the second waveguide further comprise a circular waveguide, and a diameter of each of the first and the second waveguides is about 5.08 cm;

a length of each of the first and the second waveguides is about 10.16 cm;

and a desired frequency of a signal from the antenna is about 3.5 GHz to about 4.0 GHz.

9. The protection device of claim 1, wherein the electrically insulated hardware includes at least one of a nylon screw, a nylon bolt, an insulated screw, and an insulated bolt.

10. A system comprising:

an antenna;

a protection device in signal communication and electrical communication with the antenna; and a signal receiving device in signal communication with the antenna and the protection device, wherein the signal receiving device is not in electrical communication with the antenna, wherein the protection device includes:

a first waveguide in signal communication and electrical communication with the antenna, wherein a first cable connects said antenna and said first waveguide; and a second waveguide in signal communication with the first waveguide and the signal receiving device;

wherein the first waveguide and the second waveguide are arranged in an end to end coaxial relationship, wherein the first waveguide and the second waveguide are electrically insulated from one another; and wherein the first waveguide and the second waveguide each include a flange, wherein the flange of the first waveguide is coupled to the flange of the second waveguide using electrically insulated hardware.

11. The system of claim 10, further comprising:

a first connector disposed between the first waveguide and the antenna, wherein the first connector includes a first pin inserted through a wall of the first waveguide, and a first wire connected to an interior end of the first pin and extending into an interior of the first waveguide, wherein the first cable connects an exterior end of the first pin to the antenna; and a second connector disposed between the second waveguide and the signal receiving device, wherein the second connector includes a second pin inserted through a wall of the second waveguide, and a second wire connected to an interior end of the second pin and extending into an interior of the second waveguide, wherein a second cable connects an exterior end of the second pin to the signal receiving device.

12. The system of claim 11, wherein the first cable and the second cable each further comprise coaxial cables.

13. The system of claim 10, wherein the first waveguide is electrically and physically isolated from the second waveguide by an unobstructed gap between an opening of the first waveguide and an opening of the second waveguide, wherein the first waveguide is situated a distance from the second waveguide.

14. The system of claim 10, wherein the first waveguide is electrically insulated from the second waveguide by an insulating material, wherein the insulating material completely covers an opening of at least one of the first waveguide and the second waveguide.

15. The system of claim 14, wherein the insulating material has a dielectric strength of at least about 15 kV/mm.

16. The system of claim 10, wherein the protection device has a voltage standing wave ratio (VSWR) of less than about 1:5:1.

17. The system of claim 10, wherein a size of each of the first waveguide and the second waveguide is inversely proportional to a desired signal frequency.

18. The system of claim 10, wherein the signal receiving device further comprises one of a receiver, a transceiver, and a spectrum analyzer.

19. The system of claim 10, wherein each of the first waveguide and the second waveguide further comprises one of a circular waveguide and a rectangular waveguide.

20. The system of claim 10, wherein the antenna is coupled to an electrically insulating pole for temporarily positioning the antenna to conduct a site survey, wherein the antenna is positioned in proximity to a power line where there is a potential for the antenna to accidentally touch the power line.

* * * * *